G. Potts.
Mandrel for Lining Cylinders with Metal.
Nº 10,013. Patented Sept. 13, 1853.
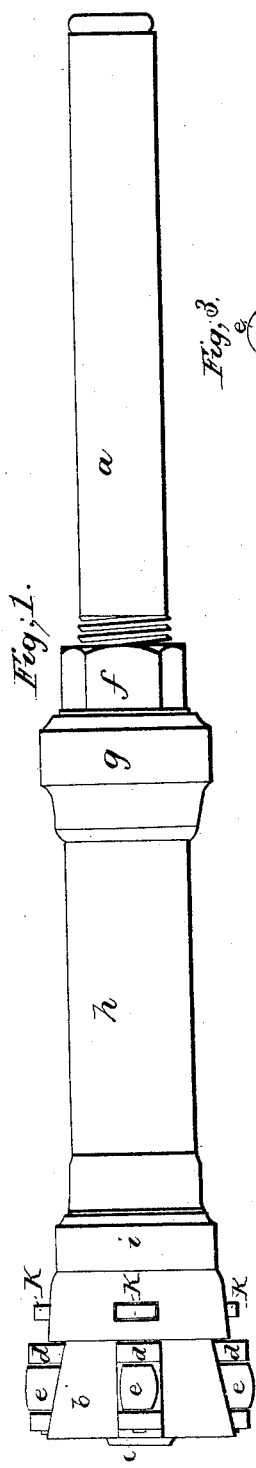
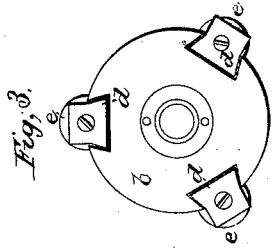
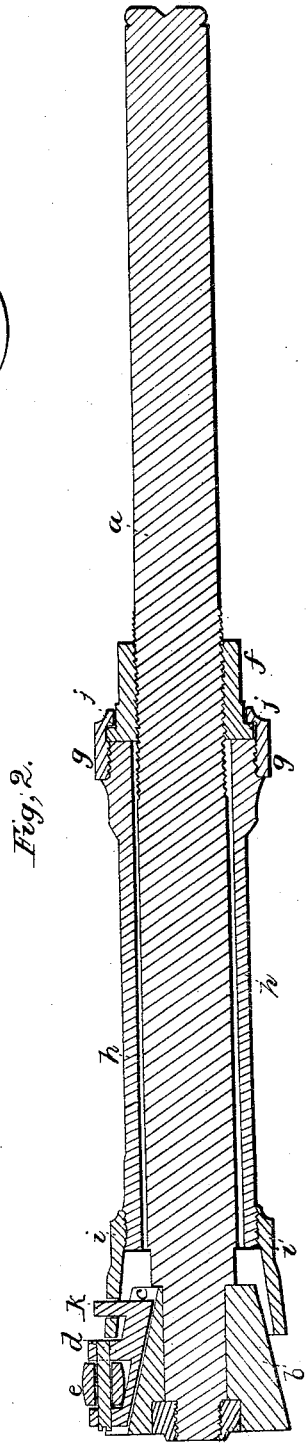
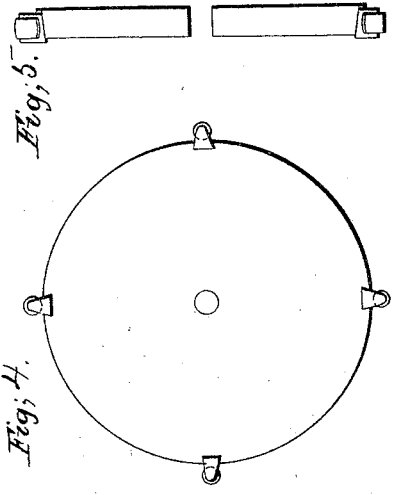

UNITED STATES PATENT OFFICE.

GEORGE POTTS, OF CINCINNATI, OHIO.

REVOLVING MANDREL FOR LINING CYLINDERS WITH METAL.

Specification of Letters Patent No. 10,013, dated September 13, 1853.

*To all whom it may concern:*

Be it known that I, GEORGE POTTS, of Cincinnati, Hamilton county, Ohio, have invented new and useful Machinery for Lining Cast-Iron Cylinders with Copper; and I do hereby declare the following to be a full, clear, and exact description thereof, reference being had to the annexed drawing, forming part of this specification.

The object of my invention is the production or manufacture of a pump or other cylinder having a lining or interior casing of sheet copper and the peculiar feature of novelty exists in devices for the application of said casing in such a manner as to give to the interior of the barrel, a smooth dense, and truly cylindrical surface, superseding the necessity of and superior in its result to the fine boring and grinding now requisite.

Cylinders lined with cast brass, are in common use, but these as is well known, always require a laborious process of boring and grinding out. This material and mode of finish leaves a comparatively rough and porous surface involving greater wear friction and labor in the use of the pump, and there is also required for strength a greater bulk and weight of metal than with sheet copper as applied on my plan.

Cylinders have been lined (imperfectly) with sheet copper, by means of a mandrel drawn through from one end to the other. The objections to this are inseparable from the nature of the process, and the material to be operated on. In the first place the entire circuit of the cylinder, being subjected to the dragging process at the same instant, there is not only great strain on the machinery, but very great liability to burst the cylinder.

Another objection arises from the fact, that copper will not suffer such a treatment without cutting and tearing, or that the interior surface of a cylinder fixed in this way is found to be full of checks and scratches produced by the adhesion of the copper to the tool.

In the accompanying drawings Figure 1 is a side view of the tool. Fig. 2 is an axial section. Fig. 3 is an end view. Figs. 4 and 5 represent a boring head rigged for lining large cylinders on such plan.

($a$) is a mandrel, terminated at its lower end by a conical head ($b$) provided with two three or more grooves ($c$), having the same obliquity with the axis of motion that the sides of the cone have. These grooves are somewhat undercut, so as to hold within them the stocks ($d$) of cast steel rollers ($e$). The outer circle described by the revolution of these rollers, can be enlarged or diminished by moving them fro and back on the conical head. This adjustment is effected by means of a nut ($f$) which by being turned backward or forward on the screw threaded shaft of the mandrel, moves the roller stocks as desired. The nut being connected with the stocks, by means of a sleeve ($g$, $h$, $i$,) surrounding the mandrel. This sleeve is provided at each end with a thimble ($g$, $i$,) screwed fast to it. A collar ($j$) inclosed by the thimble ($g$), connects the sleeve to the nut, and lugs ($k$) projecting from the stocks and through slots in the thimble ($i$) connect the sleeve to the stocks.

The operation is as follows: A sheet of copper being cut to the proper dimensions and brought to a cylindrical form, and its edges brazed together; is placed within the iron barrel, which is then properly secured to the frame of the lining apparatus. This apparatus, may have the same construction as that of the ordinary boring machine, with the single substitution of the lining tool for the boring head. The tool being advanced by the ordinary mechanism, until the rollers are just entered within the limits of the casing, the nut is screwed down so as to force the rollers apart as much as is requisite to initiate the lining process, and the tool is then rotated and gradually advanced along the interior of the cylinder until reaching the other end. If the lining is not sufficiently pressed against the concavity of the cylinder, the rollers are again slightly expanded, and the tool is drawn in the same manner back again, and so the process is continued until the work is complete.

In the case of a large cylinder, a common boring head may be rigged, with the lining apparatus by forming in the rim as many inclined and dovetailed grooves, as there are rollers wanted, and adjusting each roller with a distinct screw journaling within lugs in the head and tapped to the sliding stock of the roller. It has been found by opening a cylinder thus lined that the copper filled every honey comb and boring grooves left in the iron—although the concave surface of the copper was perfectly smooth and cylindrical.

I claim herein as new and of my invention and desire to secure by Letters Patent—

The revolving mandrel furnished with one or more rollers, whose distance from the axis of the mandrel, can be increased or diminished, by means of a nut sleeve and conical head as described, or any equivalent device, for the purpose as herein explained of lining with one metal, the interior of a cylinder formed of another metal.

In testimony whereof, I have hereunto set my hand before two subscribing witnesses.

GEORGE POTTS.

Witnesses:
GEO. H. KNIGHT,
EDWARD H. KNIGHT.